No. 823,283. PATENTED JUNE 12, 1906.
L. G. LANGSTAFF.
VESSEL FOR DISPENSING LIQUIDS.
APPLICATION FILED MAY 3, 1905.
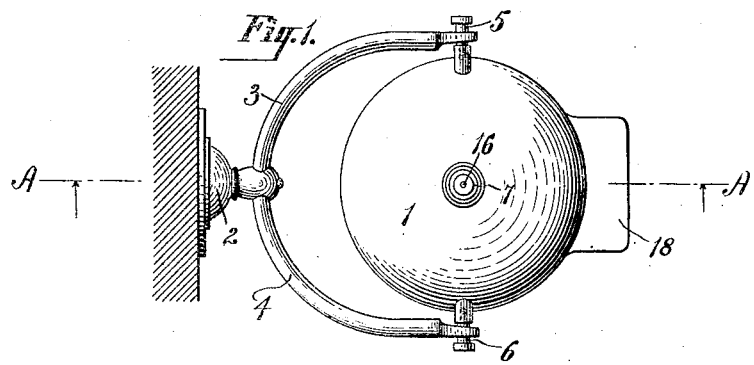
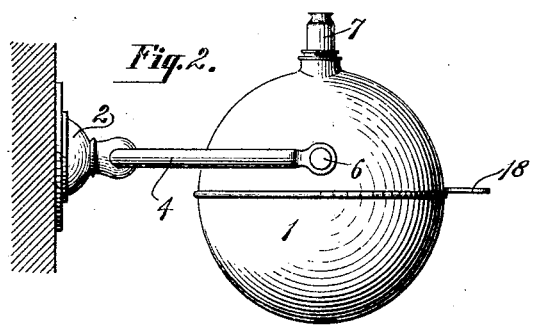
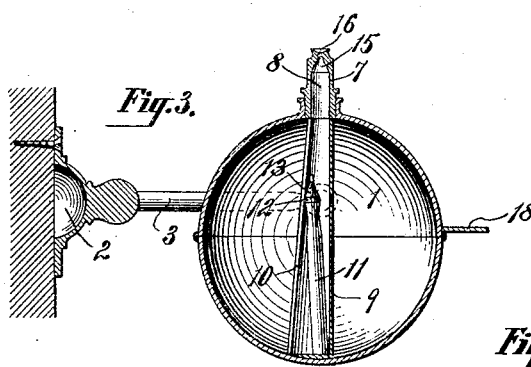
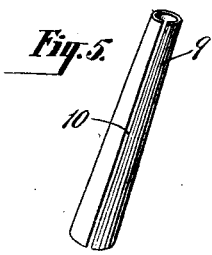
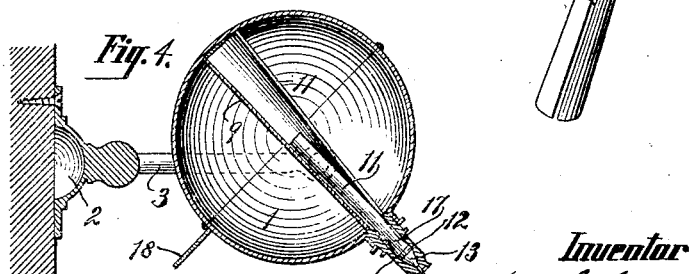
Witnesses:
F. G. Hachenburg.
Henry Thieme.
Inventor:
Lewis G. Langstaff
by attorneys

UNITED STATES PATENT OFFICE.

LEWIS G. LANGSTAFF, OF BROOKLYN, NEW YORK.

VESSEL FOR DISPENSING LIQUIDS.

No. 823,283.

Specification of Letters Patent.

Patented June 12, 1906.

Application filed May 3, 1905. Serial No. 258,705.

*To all whom it may concern:*

Be it known that I, LEWIS G. LANGSTAFF, a citizen of the United States, and a resident of the borough of Brooklyn, in the city and State of New York, have invented a new and useful Improvement in Vessels for Dispensing Liquids, of which the following is a specification.

My invention relates to an improvement in vessels for dispensing liquids, and has for its object to provide a very simple and effective device for insuring the delivery of a predetermined quantity of liquid from the vessel, the device being so arranged that the entire contents of the vessel may be delivered.

My invention is particularly directed to vessels for dispensing liquid soap or other liquid cleansing or antiseptic substances into the hands.

A practical embodiment of my invention is represented in the accompanying drawings, in which—

Figure 1 represents the vessel in top plan. Fig. 2 is a side view of the same in its normal position. Fig. 3 is a vertical central section through the same in its normal position, the section being taken in the plane of the line A A of Fig. 1. Fig. 4 is a similar section with the vessel inverted, and Fig. 5 is a perspective view of the plunger-guide.

The vessel is herein represented as a hollow sphere composed of two half-sections, the vessel being denoted by 1. A bracket for the vessel comprises a suitable base 2, fitted to be secured to the wall or other support, which base is provided with arms 3 4, between which the vessel is pivoted to swing in a vertical plane. These pivot connections between the vessel and bracket-arms are denoted by 5 and 6. A measuring-nozzle 7 has a screw-threaded engagement with the top of the vessel 1, within which nozzle is located the dispensing-chamber 8.

The means which I have shown for insuring the delivery of a predetermined amount of liquid from the vessel when the vessel is inverted and insuring the delivery of the entire contents of the vessel is constructed, arranged, and operated as follows: A tubular plunger-guide 9 extends from the bottom to the top of the vessel, with its outer wall parallel with the central line of the dispensing-chamber 8 in the measuring-nozzle 7. This tubular guide 9 is provided with a slot 10, leading from the bottom to the top of the guide through its inner wall, so as to permit the free passage of the liquid within the vessel into the guide even when there is a very small amount of liquid in the vessel.

A weighted plunger 11 is mounted to slide in the tubular guide 9, which weighted plunger is provided with a head 12, loosely fitted to the cylindrical wall of the dispensing-chamber 8. The head 12 of this weighted plunger is provided with a tapered portion 13 and point 14, which is arranged to fit the tapered portion 15 and delivery-hole 16 of the chamber 8 when the vessel is inverted. The head 12 is also provided with a reduced neck 17, so as to reduce the frictional engagement of the head 12 with the wall of the chamber 8.

When it is desired to deliver a predetermined amount of liquid, the vessel is tilted by engaging the handle 18 of the vessel. This will cause the plunger 11 to slide downwardly along the tubular guide 9, which tubular guide will direct the plunger into the dispensing-chamber 8.

When there is a very small amount of liquid within the vessel, the tubular guide 9 will act as a scoop when the vessel is inverted, thus insuring the discharge of the entire amount of liquid from the vessel. This is a very important feature, as it obviates the disadvantage which arises from leaving a small amount of liquid within the vessel which cannot be delivered.

It is evident that the shape of the vessel may be varied and that other changes might be made in the construction, form, and arrangement of the several parts without departing from the spirit and scope of my invention. Hence I do not wish to limit myself strictly to the construction herein set forth; but

What I claim as my invention is—

1. In combination, a bracket, a liquid-dispensing vessel pivoted thereto, a nozzle, a weighted plunger for positively ejecting the liquid through the nozzle when the vessel is inverted and a guide for the plunger arranged to deliver liquid from the bottom of the vessel to the nozzle.

2. In combination, a bracket, a liquid-dispensing vessel pivoted thereto, a nozzle, a tubular guide leading from the bottom of the vessel to the nozzle, said guide having a longitudinal slot leading from its bottom, and a weighted plunger in the guide arranged to positively eject the liquid through the nozzle when the vessel is inverted.

3. In combination, a bracket, a liquid-dispensing vessel pivoted thereto, a nozzle and a tubular guide extending from the bottom of the vessel to the nozzle and having its outer wall parallel with the central line of the nozzle and a plunger located in the guide arranged to positively eject the liquid through the nozzle when the vessel is inverted.

In testimony that I claim the foregoing as my invention I have signed my name, in presence of two witnesses, this 25th day of April, 1905.

LEWIS G. LANGSTAFF.

Witnesses:
FREDK. HAYNES,
HENRY THIEME.